US012603897B2

(12) United States Patent
Narayan et al.

(10) Patent No.: US 12,603,897 B2
(45) Date of Patent: Apr. 14, 2026

(54) ATTACK CHAIN IDENTIFICATION VIA MISCONFIGURATIONS IN CLOUD RESOURCES

(71) Applicant: Palo Alto Networks, Inc., Santa Clara, CA (US)

(72) Inventors: Krishnan Shankar Narayan, San Jose, CA (US); Praveen Herur, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 787 days.

(21) Appl. No.: 17/816,334

(22) Filed: Jul. 29, 2022

(65) Prior Publication Data

US 2024/0039927 A1 Feb. 1, 2024

(51) Int. Cl.
*G06F 21/57* (2013.01)
*H04L 9/40* (2022.01)

(52) U.S. Cl.
CPC ...... *H04L 63/1416* (2013.01); *H04L 63/1433* (2013.01); *H04L 63/20* (2013.01)

(58) Field of Classification Search
CPC . H04L 63/1416; H04L 63/1433; H04L 63/20; H04L 63/145; G06F 21/577; G06F 8/65
See application file for complete search history.

(56) References Cited

U.S. PATENT DOCUMENTS 11,575,696 B1 * 2/2023 Ithal .......................... G06F 9/451
2020/0137104 A1 * 4/2020 Hassanzadeh ...... H04L 63/1433

FOREIGN PATENT DOCUMENTS

CN 112600800 A 4/2021

OTHER PUBLICATIONS

PCT Application No. PCT/US2023/020360, International Search Report mailed Jul. 20, 2023, 4 pages.
PCT Application No. PCT/US2023/020360, Written Opinion of the International Searching Authority mailed Jul. 20, 2023, 9 pages.
"ATT&CK Matrix for Enterprise", 2015, [online], [retrieved on Jul. 29, 2022] Retrieved from the Internet: <https://attack.mitre.org>.
"Examples of Policy Summaries", 2017, [online], [retrieved on Jul. 29, 2022] Retrieved from the Internet: <https://docs.aws.amazon.com/IAM/latest/UserGuide/access_policies_policy-summary-examples.html>.
PCT Application No. PCT/US2023/020360, International Preliminary Report on Patentability, 9 pages.

(Continued)

*Primary Examiner* — Amie C. Lin
(74) *Attorney, Agent, or Firm* — Gilliam IP PLLC

(57) ABSTRACT

A cloud resource management system detects resource misconfiguration for resources in a cloud including cloud policy misconfigurations and resource vulnerabilities. An attack chain analyzer identifies attack chains from misconfigured resources ordered according to stages in an attack framework that models sequential behavior for malicious attacks. The attack chains are detected according to a depth-first search traversal of adjacent resources that have pairwise exposure according to characteristics indicated in the cloud policy misconfigurations and resource vulnerabilities. The attack chain analyzer generates further diagnostics that inform remediation of resource misconfigurations for malicious attack prevention.

18 Claims, 6 Drawing Sheets

(56) References Cited

OTHER PUBLICATIONS

PCT Application No. PCT/US2023/020360, Written Opinion of the
International Preliminary Examining Authority, 9 pages.
Swiler, et al., "A Graph-Based Network-Vulnerability Analysis
System", Jan. 1, 1998, 25 pages, DOI:https://doi.org/10.2172/
573291.

* cited by examiner

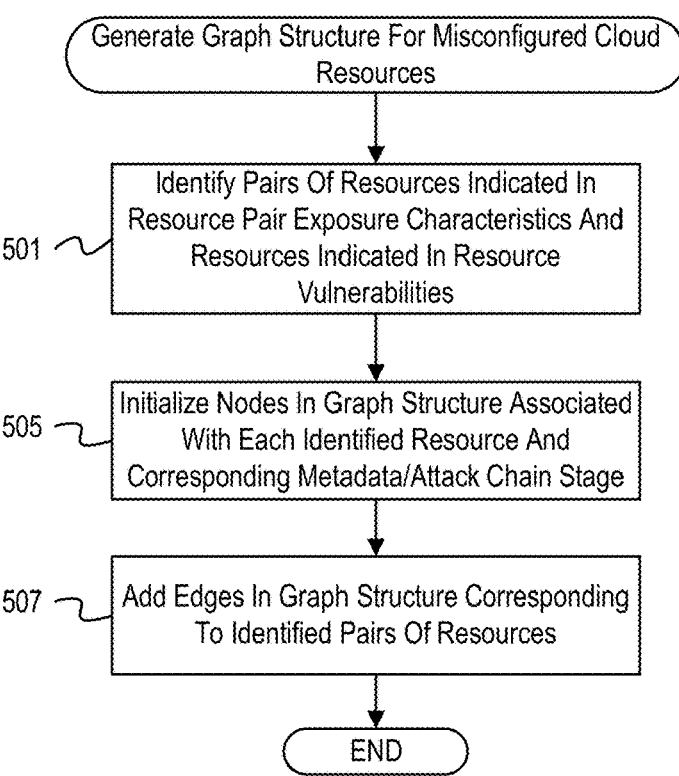

Generate Graph Structure For Misconfigured Cloud Resources

501 ~ Identify Pairs Of Resources Indicated In Resource Pair Exposure Characteristics And Resources Indicated In Resource Vulnerabilities 505 ~ Initialize Nodes In Graph Structure Associated With Each Identified Resource And Corresponding Metadata/Attack Chain Stage 507 ~ Add Edges In Graph Structure Corresponding To Identified Pairs Of Resources

END

FIG. 5

ATTACK CHAIN IDENTIFICATION VIA MISCONFIGURATIONS IN CLOUD RESOURCES

BACKGROUND

The disclosure generally relates to electrical digital data processing (e.g., CPC G06F) and security arrangements for protecting computers, components thereof, programs or data against unauthorized activity (e.g., CPC G06F 21/00).

Attack frameworks are a tool to describe potential paths for malicious attackers to enter and exploit vulnerable systems. These frameworks depict sequential stages, and a malicious attack occurs sequentially through one or more of these stages (possibly skipping intermediate stages). Each resource in a cloud with security exposure can be classified according to one of the stages in an attack framework as being a potential target for a malicious attack occurring at that stage. In some instances, resources having multiple security exposures are classified with multiple stages and these resources can be revisited multiple times in a single attack or across multiple attacks. Analysis of resources for stage classification occurs by tracking events at each resource.

BRIEF DESCRIPTION OF THE DRAWINGS

Aspects of the disclosure may be better understood by referencing the accompanying drawings.

FIG. 5 is a flowchart of example operations for generating a graph structure for misconfigured cloud resources.

DESCRIPTION

Figure 1:
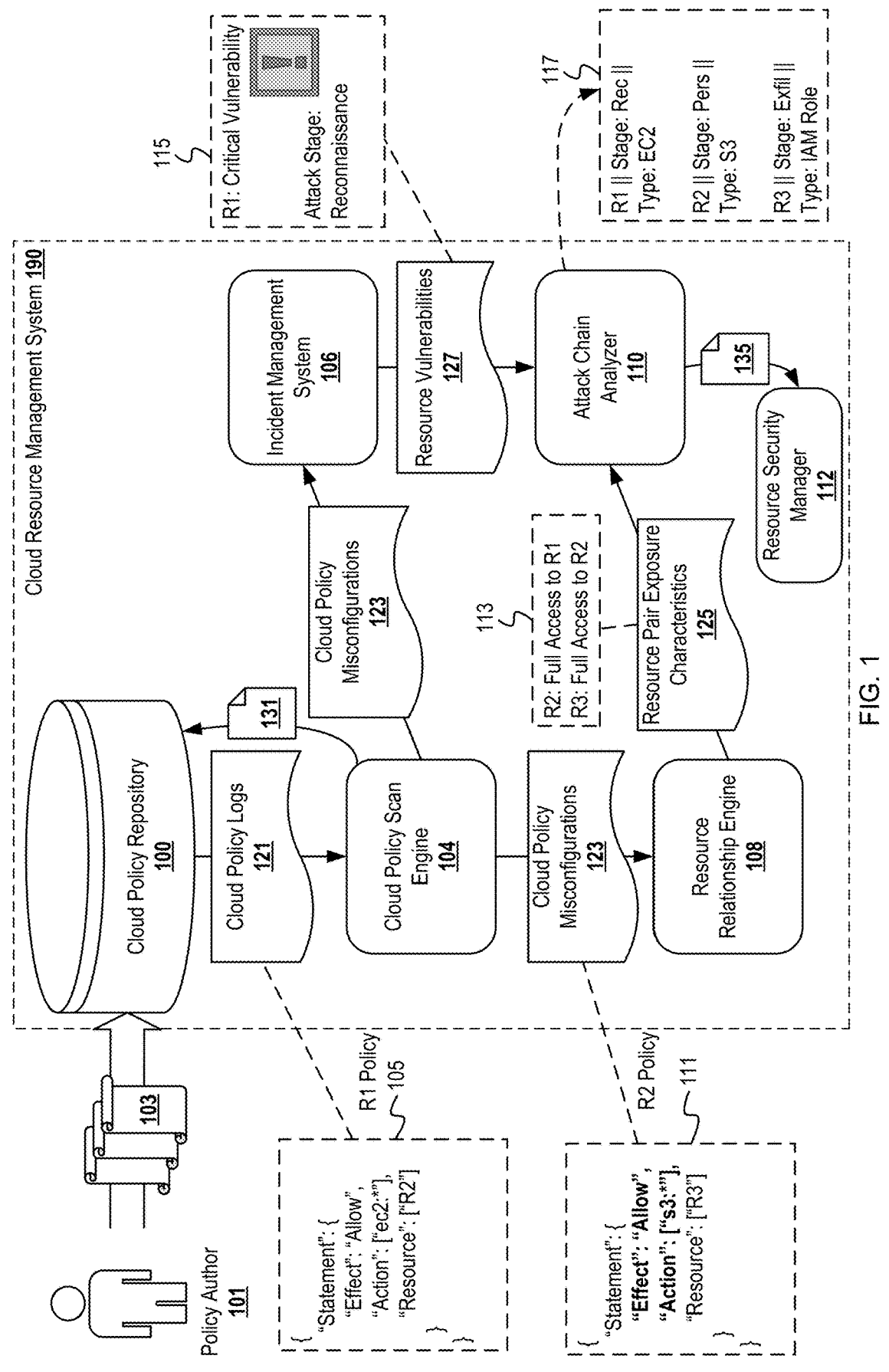
FIG. 1 is a schematic diagram of an example system for identifying attack chains in cloud resources via resource misconfigurations.

The description that follows includes example systems, methods, techniques, and program flows that embody aspects of the disclosure. However, it is understood that this disclosure may be practiced without these specific details. For instance, this disclosure refers to identifying attack chains for potential malicious attackers through resources in a cloud according to an attack framework using depth-first search (DFS) in illustrative examples. Aspects of this disclosure can be also applied to detecting attack chains across resources in any computing environment according to any sequential, stage-based framework using a search algorithm for chain identification. In other instances, well-known instruction instances, protocols, structures and techniques have not been shown in detail in order not to obfuscate the description.

Overview

Current attack stage analysis systems identify resources with potential security exposure and use data collected at each resource to classify resources with corresponding attack stages. Analysis occurs in isolation at each resource using event logs; this type of analysis at each resource leads to difficulty in correlating attack incidents from a same attacker across multiple resources and provides noise in resource classifications for resources that are not exposed to attacks and/or only allow access to public/non-sensitive data. Existing attack chain analysis that relies on event logs is cumbersome and retroactive, relying on attacks to occur prior to analyzing attack chains. This requires intake and analysis of all flagged event logs to determine whether an attack is occurring at a respective resource, leading to alert fatigue and delays in remediation. Conversely, tracking resources across consecutive attack stages allows for streamlined analysis and identification of critical vulnerabilities for immediate remediation and diagnostics.

Disclosed herein is an attack chain analyzer that intakes policy misconfigurations, resource vulnerabilities, resource attack stage labels, and resource pair exposure characteristics and identifies attack chains thereof. Attack chain identification occurs in a DFS of resources according to attack stages, resource pair exposure characteristics, and resource vulnerabilities for misconfigurations of corresponding resources. The DFS executes on a graph structure for resources that is defined according to these resource pair exposure characteristics and resource vulnerabilities. The attack chain analyzer initializes a recursion at an initial resource with an earliest attack stage among resources with detected misconfigurations. The attack chain analyzer then iterates recursively breadth-first by identifying resources accessible (adjacent) to the initial resource that also have misconfigurations (e.g., the initial resource has overprivileged access rights) that are at a further stage in the attack chain (recursion starts with resources closest in the attack chain to the initial resource). Accessible resources are identified using the resource pair exposure characteristics. Once a resource is identified in each recursion that does not expose any additional resources, the corresponding attack chain gets logged, and recursion returns to the previously identified resource.

This DFS occurs multiple times starting at each resource having a misconfiguration not seen in a previous DFS iteration. The DFS used herein is low-overhead due to use of bitmask operations. The attack chain analyzer logs and generates diagnostics for attack chains identified across DFS iterations according to corresponding severity metrics for resources in each attack chain. This efficient attack chain identification and analysis allows for reduction of overall system stress from processing an overabundance of alerts by prioritizing each alert within known attack chains. Additionally, remediation occurs at key stages within each attack stage which reduces the need for remediation at every resource classified with an attack stage. Finally, attack chains are scored for severity, and individual resources within each attack chain are further scored/prioritized based on importance for resource/data exposure, resulting in a more granular and detailed attack analysis.

Terminology

The term "cloud policy" as used herein refers to a policy indicating configuration of a cloud resource that determines access rights to physical and/or virtual components of the cloud resource. Cloud policies can be defined according to configuration files for native and/or Software as a Service (SaaS) cloud APIs and can indicate types of resources and resource identifiers along with allowable actions for resources corresponding to the types and identifiers on the resource corresponding to the configuration files.

The term "misconfiguration" as used herein refers to a configuration that exposes corresponding resource(s) to security risk. Misconfigurations can include overprivileged access, access to certain resource functionality, access to sensitive data, resource vulnerabilities, etc. "Policy misconfigurations" or "cloud policy misconfigurations" refer to misconfigurations indicated in cloud policies. Cloud policy misconfigurations can be represented as fields in cloud policy configuration files, standardized (signature) misconfigurations, and/or textual/semantic descriptions of the misconfiguration and corresponding security risks.

The term "resource vulnerability" (alternatively "vulnerability") as used herein refers to code units, storage, software, hardware, etc. on resources that have known vulnerabilities to malicious attacks.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Illustrations

FIG. 1 is a schematic diagram of an example system for identifying attack chains in cloud resources via resource misconfigurations. A cloud resource management system 190 (hereinafter "management system 190") comprises various components for aggregation of cloud resource data, cloud policy analysis, attack chain identification, and cloud resource remediation thereof. The management system 190 comprises an attack chain analyzer 110 that receives data from various data sources representing potential attack vectors within and across cloud resources including resource vulnerabilities 127 and resource pair exposure characteristics 125 generated by an incident management system 106 and a resource relationship engine 108, respectively, according to cloud policy misconfigurations 123 identified by a cloud policy scan engine 104. Attack chains identified by the attack chain analyzer 110 can be used to detect and fix key/critical misconfigurations that expose remaining resources to security vulnerabilities. At the root of the attack chain analysis by the attack chain analyzer 110 are cloud policies stored by a cloud policy repository 100 that determine access rights across cloud resources, data flow between cloud resources, databases and/or repositories accessible by cloud resources, etc.

A policy author 101 generates policies 103 for cloud resources that are stored in a cloud policy repository 100. The policies 103 correspond to configurations for cloud resources that are generated when cloud resources are initialized (e.g., by querying an application programming interface (API) for a cloud service provider (CSP)). In some instances, policies for cloud resources are automatically maintained by a CSP and, rather than being manually added by the policy author 101, the cloud policy repository 100 can query the CSP for cloud policies according to known resources in the cloud. Policies can be periodically updated to track changes.

In response to a query 131 from a cloud policy scan engine 104, the cloud policy repository 100 returns cloud policy logs 121. The cloud policy scan engine 104 can query for cloud policy logs periodically according to a schedule, whenever cloud policies are updated (e.g., based on automatic updates by the cloud policy repository 100 via queries to an API for a CSP), based on a trigger from the policy author 101, subsequent to attacks occurring at one or more cloud resources, etc. An example cloud policy log 105 for a resource "R1" is the following:

```
{
  "Statement" {
    "Effect": "Allow",
    "Action": ["ec2 :*"],
    "Resource": ["R2"]
  }
}
```

This policy log represents a policy that allows (as indicated by "Effect": "Allow" syntax) full access by a resource "R2" (as indicated by "Resource": ["R2"] syntax) to an Amazon Web Services® (AWS) Amazon Elastic Compute Cloud (Amazon EC2®) resource (i.e. "R1") corresponding to the policy. For instance, R2 can be an identity access management (IAM) role for a user of AWS. A misconfiguration for resources R1 and R2 can be that R2 has overprivileged access to potentially sensitive data on R1. Cloud policy logs for cloud resources that are initialized and configured according to APIs for other CSPs such as Google Cloud Platform® (GCP) service are anticipated. Additionally, in some embodiments, cloud policies and resource configurations can be generated according to APIs for natively implemented cloud resources.

The cloud policy scan engine 104 continuously scans cloud policy logs to detect cloud policy misconfigurations 123 that are communicated to the incident management system 106 and the resource relationship engine 108. An example cloud policy misconfiguration 111 for resource "R2" is the following:

```
{
  "Statement": {
    "Effect": "Allow",
    "Action": ["s3*"],
    "Resource": ["R3"]
  }
}
```

The example cloud policy misconfiguration 111 represents a cloud policy that allows (as indicated by the "Effect": "Allow" syntax) full access by a resource R3 (as indicated by the "Resource": ["R3"]) to an Amazon Simple Storage Service (Amazon S3) resource (i.e., "R2") corresponding to the policy. The example cloud policy misconfiguration 111 can be that the Amazon S3 resource R3 has overprivileged access to R2 and that R2 contains potentially sensitive data. Note that the "effect" and "action" fields are in bold to indicate that these fields are allowing overprivileged access by R3 to R2. This is for illustrative purposes, and cloud policy misconfiguration can have various formats when stored in memory. For instance, these fields along with the resource identifiers R3, R2 can be stored in memory, a standardized representation of these fields along with the resource identifiers can be stored in memory, a semantic description of the overprivileged access can be stored in memory, etc.

The cloud policy misconfigurations 123 can be generated directly from the cloud policy logs 121 by detecting predefined patterns. For instance, misconfigurations can correspond to signatures stored on the cloud policy scan engine 104 that represent misconfigurations normalized across cloud APIs. The cloud policy scan engine 104 can normalize cloud policies in the cloud policy logs 121, can compare the normalized versions to signatures (e.g., according to Levenshtein distance, exact match, etc.), and can add cloud policies matching the signatures to the cloud policy misconfigurations 123. Alternatively, the cloud policy scan engine 104 can run a cloud policy misconfiguration detection model (not depicted) on the cloud policy logs 121 (e.g., after preprocessing raw log files to extract tokens). If the cloud policy misconfiguration detection model outputs for a cloud policy a probability of being misconfigured above a threshold probability, then the cloud policy is added to the cloud policy misconfigurations 123. These are example implementations for detecting cloud policy misconfigurations from cloud policy logs.

The cloud policy scan engine 104 communicates the cloud policy misconfigurations 123 to the incident management system 106 and the resource relationship engine 108. The incident management system 106 receives the cloud policy misconfigurations 123 and generates resource vulnerabilities 127. The incident management system 106 can analyze resources indicated in the cloud policy misconfigurations 123 to determine the resource vulnerabilities 127. The analyzed resources can include multiple resources indicated within each cloud policy misconfiguration corresponding to overprivileged access rights, open ports, known malware having vulnerability exploits for certain types of resources, etc. Certain resources can be flagged as having access to or containing sensitive data, whereas other resources can be flagged as having access to or containing publicly accessible data. Accordingly, the incident management system 106 can deem certain resource vulnerabilities as benign and can refrain from including these resources in the resource vulnerabilities 127 or can add them with a "benign vulnerability" label. In some embodiments, benign resource vulnerabilities can be tracked over time to determine whether security risk escalates due to increased resource exposure.

An example resource vulnerability 115 indicates a critical vulnerability for a resource with identifier R1 and an attack stage for the vulnerability of reconnaissance. The resource vulnerabilities 127 can have vulnerability classifications depending on severity of the corresponding vulnerability (e.g., low, medium, high, critical, etc.). The severity can be determined based on the corresponding misconfiguration as well as flags for any associated resources. To exemplify, if R1 is a cloud computing instance and the corresponding policy misconfiguration indicates that R1 has full access to highly sensitive information (e.g., a full access policy to cloud computing resources with sensitive user data), then the resource vulnerability for R1 can be indicated as having a critical vulnerability. Conversely, if the policy misconfiguration indicates that R1 has limited access to low sensitivity or publicly accessible data, then the resource vulnerability can have a low vulnerability or benign vulnerability. The incident management system 106 includes all detected resource vulnerabilities and associated metadata in the resource vulnerabilities 127 and communicates the resource vulnerabilities 127 to the attack chain analyzer 110.

The resource relationship engine 108 also receives the cloud policy misconfigurations 123 and generates resource pair exposure characteristics 125. Example resource pair exposure characteristics 113 indicates that a resource R2 has full access to a resource R1 and that a resource R3 has full access to R2. The resource relationship engine 108 can generate resource pair exposure characteristics 125 according to corresponding APIs for cloud policies in the cloud policy misconfigurations 123. For instance, for the example cloud policy misconfiguration 111, the resource relationship engine 108 can identify the "Effect" and "Allow" fields to determine that this is an access policy and can identify the corresponding allowed resources in the "Resource" field. Alternatively, these fields can be indicated in the cloud policy misconfigurations 123 themselves when identified by the cloud policy scan engine 104 and the resource relationship engine 108 can analyze the identified fields to determine the characteristics of the misconfigured policy. The resource relationship engine 108 can additionally indicate resource configurations such as resource types, exposed ports, etc. in the resource pair exposure characteristics 125 and can include severity metrics that depend on types of exposed resources, breadth of resource exposure (e.g., number of resources with overprivileged access to a resource), importance of exposed ports, etc.

In some embodiments, the cloud policy misconfigurations 123 comprise signatures corresponding to normalized versions of cloud policies having common misconfiguration types, and the resource relationship engine 108 can identify fields in the original (non-signatured) misconfigurations that correspond to fields in the signatures that are misconfigured. The resource relationship engine 108 can then analyze the identified fields to determine the resource pair exposure characteristics 125. Resources indicated in the cloud policy misconfigurations 123 may not correspond to a pair of exposed resources. For instance, cloud policy misconfigurations 123 can include resources that have known vulnerabilities to certain types of malware but do not have exposure to other resources that are misconfigured. The resource relationship engine 108 communicates the resource pair exposure characteristics 125 to the attack chain analyzer 110.

The incident management system 106 and/or the resource relationship engine 108 further determine an attack stage for each resource indicated in the resource vulnerabilities 127 and the cloud policy misconfigurations 123. In some embodiments this is performed by a separate component such as third-party software. The attack stages are sequential stages according to a framework for attack chain analysis that delineates entry points and subsequent infiltration and exfiltration stages for known malware attacks. For instance, the attack stage framework can be the MITRE ATT&CK® framework. While attack stages occur in a prespecified order, malware attacks can skip certain stages and can start at any attack stage. Attack stages can be determined using event logs, resource pair exposure characteristics, resource vulnerabilities, cloud policy logs, resource metadata, etc. at corresponding resources. These attack stages are included in the resource vulnerabilities 127 and/or the resource pair exposure characteristics 125.

The attack chain analyzer 110 (or, in some embodiments, separate components of the management system 190) uses the resource vulnerabilities 127 and the resource pair exposure characteristics 125 to generate a graph structure for cloud resources indicated therein. Edges of the graph structure correspond to pairs of resources indicated in the resource pair exposure characteristics 125, for instance, one resource having overprivileged access to another resource. Each edge of the graph structure is associated with an attack stage according to the attack stage framework indicated in the resource pair exposure characteristics 125 and direction of the edge corresponds to directions of malicious attacks at the corresponding attack stage. Vertices of the graph structure correspond to resources, and each vertex has metadata stored thereon including resource vulnerabilities, vulnerability and/or policy misconfiguration severity, resource type, attack stage in a stage-based attack framework, etc. The graph structure has directed edges, wherein a first resource pointing to a second resource along a directed edge has access to the second resource. In some embodiments, the graph structure can have an undirected edge which indicates a bidirectional relationship between the connected nodes. An undirected edge between nodes can be used to indicate traversal from a first node to a second node at a first attack stage and traversal back to the first node from the second node at a subsequent attack stage. Note that these undirected edges can be constructed as two directed edges in the graph data structure because each directed edge has an associated attack stage. Similarly, nodes can have multiple incoming directed edges from a same source node that correspond to policy misconfigurations at multiple attack stages.

The attack chain analyzer 110 performs attack chain analysis according to DFS through the graph structure generated from the resource vulnerabilities 127 and the resource pair exposure characteristics 125 ordered by their corresponding attack stages. The attack chain analyzer 110 determines a resource indicated in the resource vulnerabilities 127 and the resource pair exposure characteristics 125 with an earliest attack stage (e.g., breaking ties arbitrarily). The attack chain analyzer 110 then iterates through resources with exposure to the current resource indicated in the resource pair exposure characteristics 125 according to edges in the graph structure starting with resources having earliest attack stages. This process occurs recursively in the DFS with the recursion terminating whenever the attack chain analyzer 110 determines that a resource does not have exposure to any resources (i.e., edges in the graph structure) with a same or later attack stage according to the attack framework and logging the current attack chain at the end of every recursion. Details for implementation of the DFS are described in greater detail with respect to FIG. 4.

For each identified attack chain, the attack chain analyzer 110 generates a log including attack chain diagnostics 135 such as example attack chain diagnostics 117. The example attack chain diagnostics 117 indicate a first resource R1 at attack stage reconnaissance with resource type Amazon EC2, a second resource R2 at attack stage persistence with type Amazon S3 and a third resource R3 at attack stage exfiltration with resource type IAM role. The attack chain diagnostics 135 can comprise additional information such as resource metadata (e.g., resource types, configurations, etc.), misconfiguration data (e.g., corresponding resources and severity metrics), exposure characteristics, etc. as well as fields indicated in the resource pair exposure characteristics 125 for remediation and vulnerabilities identified in the resource vulnerabilities 127. The attack chain analyzer 110 can further present the attack chain diagnostics 135 to a graphical user interface (not depicted) for inspection by an expert. The attack chain analyzer 110 collects attack chain diagnostics 135 for the identified attack chains and communicates them to a resource security manager 112 for remediation of any identified misconfigurations.

Figure 2:
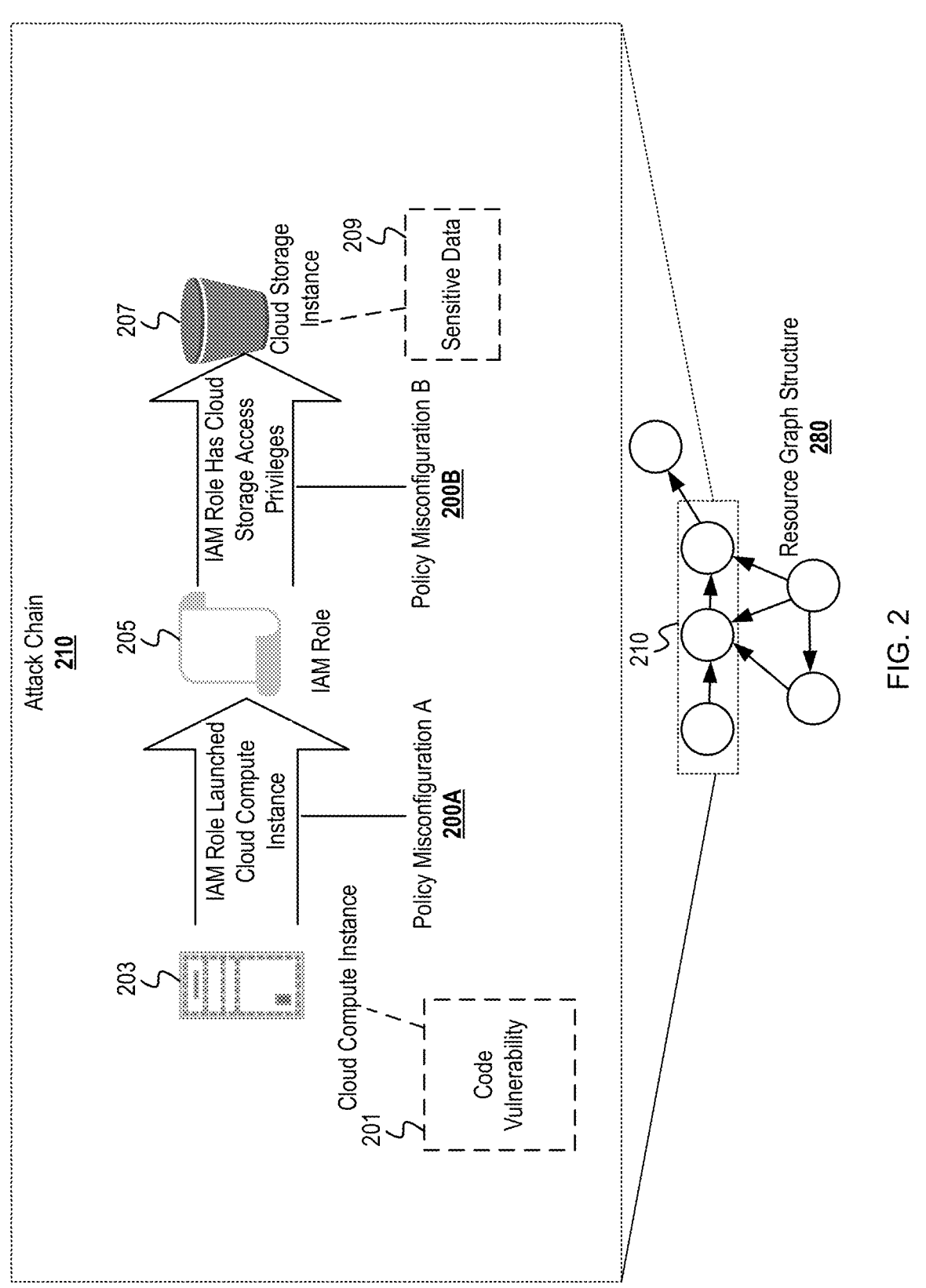
FIG. 2 is a schematic diagram of an example resource graph structure from resource misconfigurations across cloud resources.

FIG. 2 is a schematic diagram of an example resource graph structure from resource misconfigurations across cloud resources. A resource graph structure 280 comprises an attack chain 210. The attack chain 210 is depicted in a zoomed in view and comprises a chain of misconfigurations defining a graph structure from a cloud compute instance 203 to an IAM role 205 to a cloud storage instance 207. The cloud compute instance 203 comprises a code vulnerability 201. The code vulnerability 201 can correspond to known malware that the cloud compute instance 203 is susceptible to, for instance malware that targets specific applications or malware that targets ports exposed by code running on the cloud compute instance 203. The cloud compute instance 203 can be a target for an entry-level attack stage for an attack chain (e.g., reconnaissance, resource development, initial access).

A policy misconfiguration A 200A indicates that the IAM role 205 launched the cloud compute instance 203. The IAM role 205 having launched the cloud compute instance 203 can grant the IAM role 205 permissions over accessing the cloud compute instance 203. This, in turn, can expose the IAM role 205 to malicious and/or exposed code running on the cloud compute instance 203 (e.g., via account manipulation) by a malicious attacker via the code vulnerability 201. The IAM role 205 can be associated with attack stages such as persistence, privilege escalation, credential access, and lateral movement as an attacker gains control of the IAM role 205 and accesses resources according to its privileges.

A policy misconfiguration B 200B indicates that the IAM role 205 has access privileges for the cloud storage instance 207. The cloud storage instance 207 has a resource vulnerability comprising sensitive data 209 that may contain sensitive user information. The attack chain 210 may be that a malicious attacker gains access to the cloud compute instance 203 via code vulnerability 201, the malicious attacker identifies IAM role 205 as having launched the cloud compute instance 203 and gains access to the IAM role 205, then the malicious attacker secures access to the sensitive data 209 stored on the cloud storage instance 207 using privileges of the IAM role 205. The cloud storage instance 207 can be associated with attack stages such as collection, exfiltration, and impact.

Note that each of these resources 203, 205, and 207 can be involved in multiple attack chains and multiple attack stages within the resource graph structure 280. For instance, the cloud compute instance 203 can be accessed by multiple IAM roles and/or other resources. The IAM role 205 can have overprivileged access to multiple data stores, virtual machines, or other resources that have security exposures. The cloud storage instance 207 can be accessed by multiple other IAM roles and/or other cloud resources. Attack chains can thus visit and revisit any of the resources 203, 205, and 207 and any additional resources depicted in the resource graph structure 280 via their corresponding misconfigurations. Consequently, the present disclosure performs a graph structure analysis of all possible attack chains via these misconfigurations to identify possible paths through resources for malicious attacks. In some embodiments, cycles of attack chain paths are avoided because each resource in an attack chain has a subsequent attack stage to prior resources, thus an attack chain can have length at most the number of attack stages in a corresponding attack stage framework. In other embodiments, attack chains can comprise multiple (consecutive) resources at a same attack stage, and graph search algorithms applied to the resource graph structure 280 can implement a data structure that tracks visited resources at each attack stage to avoid infinite cycles when identifying attack chains.

Figure 3:
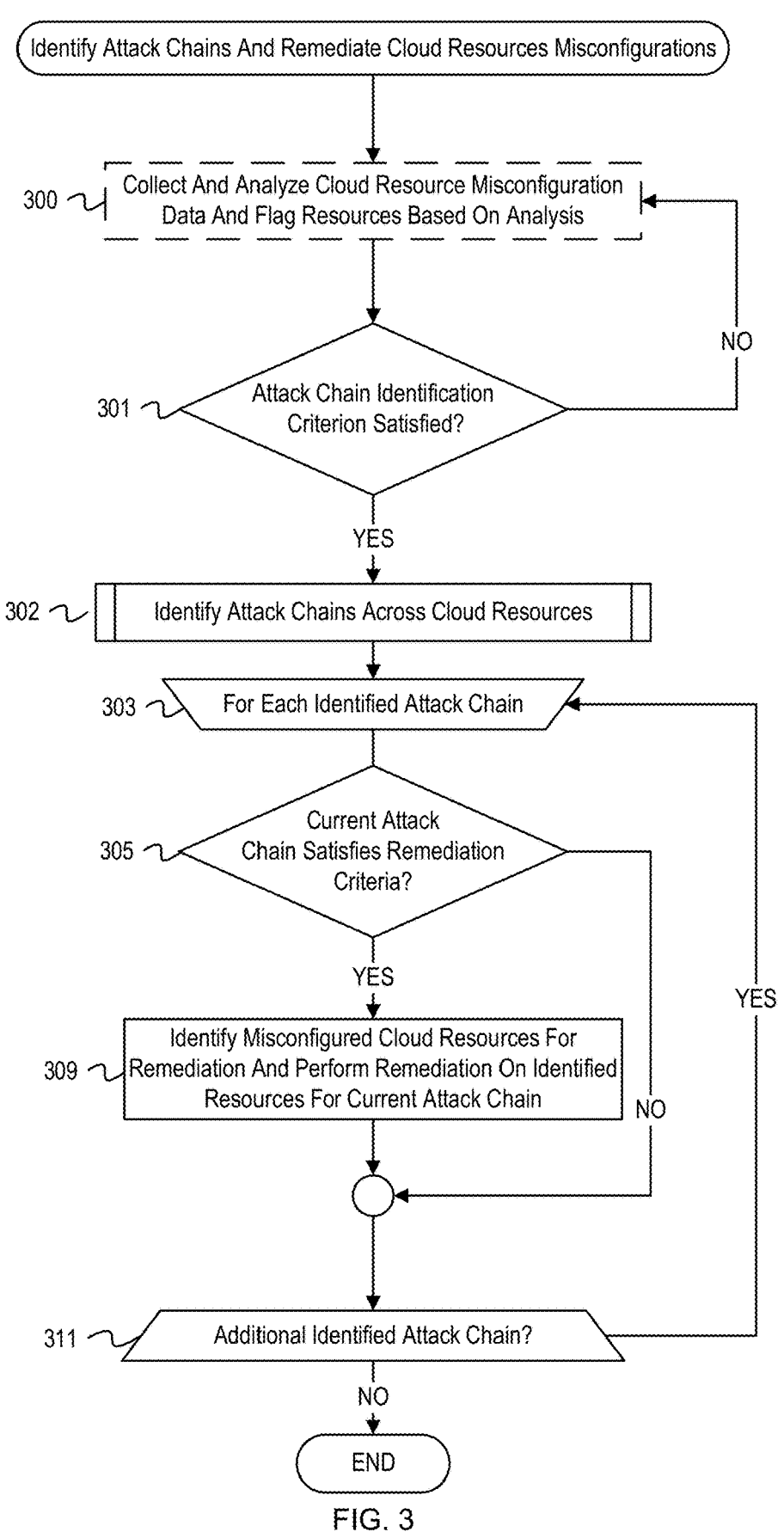
FIG. 3 is a flowchart of example operations for remediating resource vulnerabilities and misconfigurations with attack chains.
Figure 4:
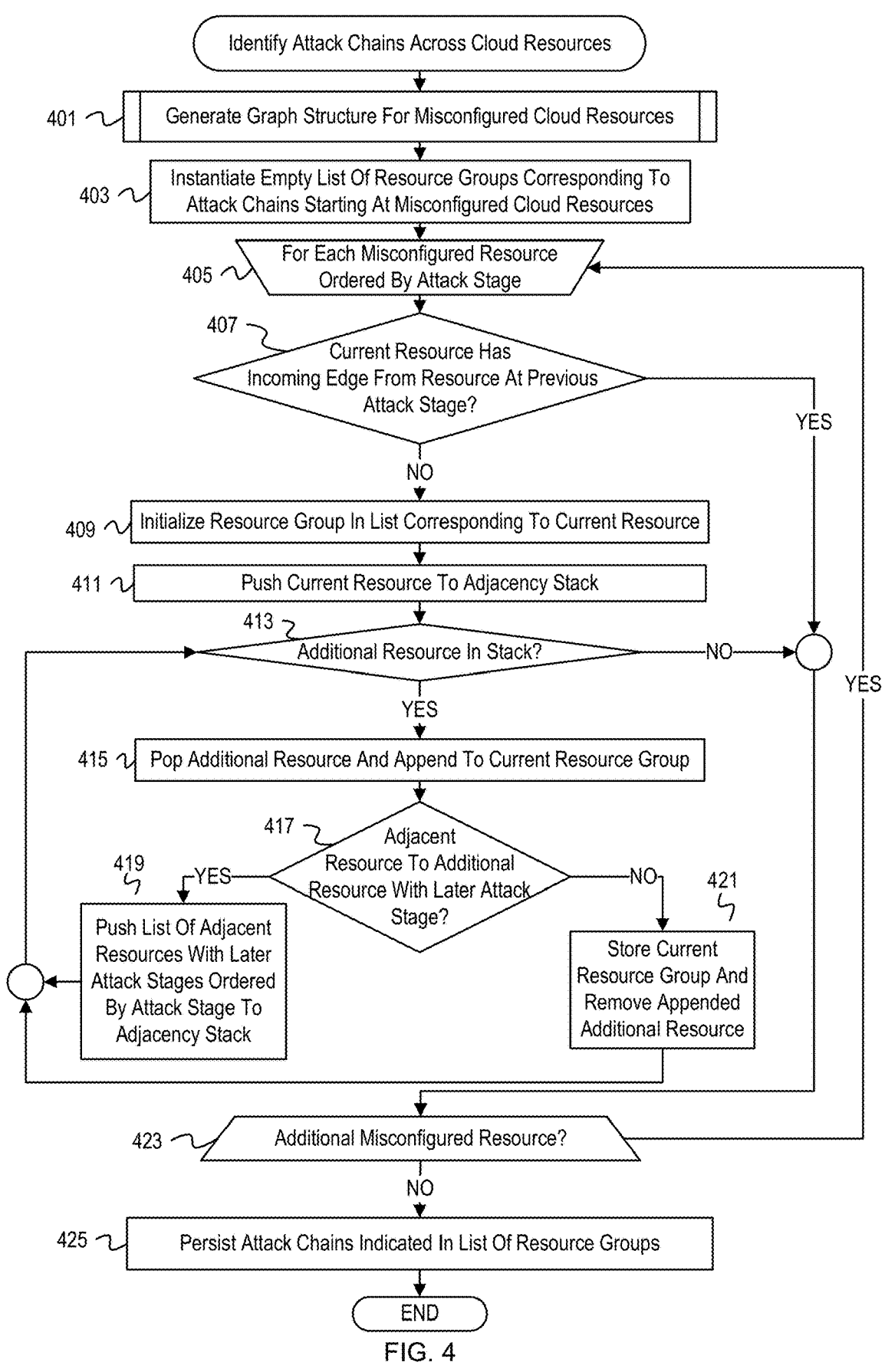
FIG. 4 is a flowchart of example operations for identifying attack chains across resources.

FIGS. 3-5 describe example operations for identifying attack chains across resources according to misconfigurations using DFS and remediating identified attack chains. The example operations are described with reference to a cloud resource management system and an attack chain analyzer for consistency with the earlier figure(s). The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for identifying attack chains and remediating cloud resource misconfigurations. At block 300, a cloud policy management system ("management system") collects and analyzes cloud resource misconfiguration data. The cloud resource misconfiguration data can correspond to resources monitored for a given entity (e.g., an organization, a department, a local area network, etc.). The cloud resource misconfiguration data comprises cloud policy logs and resource metadata that the management system analyzes for resource pair exposure characteristics and resource vulnerabilities, as well as severity metrics and metadata thereof. The management system flags resources with misconfigurations that are indicated in resource pair exposure characteristics and/or resource vulnerabilities during this analysis. In some embodiments, resources with corresponding misconfigurations with a severity metric above or equal to a threshold (e.g., low) are flagged and resources with misconfigurations having a severity metric below a threshold (e.g., benign) are not flagged. Resources can have multiple severity metrics corresponding to multiple policy misconfigurations and/or resource vulnerabilities. Each of these misconfigurations can correspond to distinct severity metrics and respective thresholds for flagging each misconfiguration, and flagging can comprise indicating misconfigurations to be remediated. Block 300 is depicted with a dotted line to indicate that the management system continuously collects and analyzes cloud resource misconfiguration data as cloud policies are created and new resource misconfigurations are detected and analyzed. The cloud policy logs, resource pair exposure characteristics, and resource vulnerabilities can be collected and analyzed by distinct or same components on the management system and can be collected and analyzed on different schedules according to configurations of these various respective components.

At block 301, the management system determines whether an attack chain identification criterion is satisfied. The attack chain identification criterion can be that a threshold amount of cloud policy logs has been collected, that a predetermined time interval(s) for corresponding components of the management system has elapsed, that a threshold number of cloud misconfigurations are identified and analyzed, any combination thereof, etc. If the attack chain identification criterion is satisfied, flow proceeds to block 302. Otherwise, flow returns to block 300.

At block 302, an attack chain analyzer identifies attack chains across cloud resources. The operations at block 302 are described in greater detail with reference to FIG. 4.

At block 303, a resource security manager begins iterating through identified attack chains. Example operations within each iteration are represented by blocks 305 and 309.

At block 305, the resource security manager determines whether the current attack chain satisfies remediation criteria. The remediation criteria can depend on resource vulnerabilities and resource pair misconfigurations indicated in diagnostics generated for the current attack chain and corresponding severities. For instance, the resource security manager can determine whether any of the resource misconfigurations in the attack chain have a severity greater to or equal to a threshold severity (e.g., high severity threshold), whether a threshold number of misconfigurations have a severity above a threshold severity (e.g., low severity threshold), etc. In some embodiments, the resource security manager can maintain a list of critically exposed resources (e.g., resources with access to or storage of sensitive data), and any attack chain with one of the exposed resources can satisfy the remediation criteria. If the current attack chain satisfies the remediation criteria, flow proceeds to block 309. Otherwise, flow proceeds to block 311.

At block 309, the resource security manager identifies misconfigured cloud resources for remediation and performs remediation on the identified resources for the current attack chain. The resource security manager can identify misconfigured resources for remediation based on misconfigurations indicated in diagnostics for the current attack chain. For instance, resources with resource vulnerabilities and policy misconfigurations having severity metrics above corresponding thresholds can be identified for remediation. In some embodiments, the resource security manager can track exposure across the current attack chain and can identify a subset of key misconfigured resources to be remediated that expose the remainder of resources to security vulnerabilities. Remediating these key misconfigured resources can remediate entire attack chains. For instance, the resource security manager can determine that remediating a misconfiguration at a resource(s) in the attack chain can prevent exposure of subsequent resources and the subsequent resources in the attack chain do not require remediation (provided, for instance, corresponding severity metrics are sufficiently low). The resource security manager can identify resources throughout attack chains that prevent exposure for the remainder. Accordingly, the resource security manager can, as examples cut off exposure of other resources in the chain to malware exploits at certain resources, cut off exposure to sensitive data, etc. Subsequent to identifications, the resource security manager corrects the identified misconfigurations for remediation. For instance, the resource security manager can replace privileges/access rights for resources with reduced privileges/access rights based on fields in cloud policies indicated in the diagnostics for remediation. For misconfigurations corresponding to code vulnerabilities on resources, the resource security manager can issue software/firmware updates that mitigate malicious attacks associated with these code vulnerabilities.

At block 311, the resource security manager determines whether there is an additional identified attack chain to evaluate for remediation. If there is an additional identified attack chain to evaluate, flow returns to block 303. Otherwise, the operations in FIG. 3 are complete.

FIG. 4 is a flowchart of example operations for identifying attack chains across cloud resources. At block 401, an attack chain analyzer generates a graph structure for misconfigured cloud resources. Example operations for generating a graph structure for misconfigured cloud resources are described in detail with reference to FIG. 5.

At block 403, the attack chain analyzer instantiates an empty list of resource groups corresponding to attack chains starting at misconfigured cloud resources in the graph structure. Each resource group comprises a data structure describing attack chains starting at a given resource. The attack chain analyzer uses the list of resource groups as a data structure to track attack chains during DFS of the graph structure for attack chain identification. While described as a list of resource groups, any appropriate data structure for tracking and subsequently persisting attack chains during DFS or other types of searching the graph structure can be implemented. Moreover, this data structure can be adapted to the particular algorithm(s) being implemented for searching or graph structure traversal.

To exemplify, a resource group can be associated with a bit string as follows:

Attack Stage Bits|Resource Group Bits|Optional Bits

The attack stage bits represent the current attack stage of the attack chain, the resource group bits represent sequential identifiers of each resource in the attack chain, and optional bits can be user-enabled flags such as an auto-remediation flag. Stages in the stage-based attack framework present in the attack chain can be represented in the attack stage bits as a bit string with number of bits equal to the number of attack stages with a 1 indicating that a resource with that attack stage is present in the attack chain and a 0 indicating that no resource is present. The optional bits can be modified according to characteristics of the added resource (e.g., severity metrics of misconfigurations). Note that this bit string uniquely describes the current attack chain at a given DFS iteration, so that attack chains can be each stored as the above bit string during DFS iterations, and the bit string can be used to generate a diagnostic log when an attack chain is generated.

At block 405, the attack chain analyzer begins iterating through misconfigured resources ordered by attack stage. The graph structure for misconfigured cloud resources can have functionality for efficiently outputting misconfigured resources by order of attack stage (e.g., by ordering resources according to attack stage as they are added). The attack chain analyzer can iterate through misconfigured resources starting with misconfigured resources having an earliest attack stage (i.e., resources that are attacked first during a malicious attack) or can iterate through misconfigured resources starting with misconfigured resources having a latest attack stage. Because resources can have multiple associated attack stages, each resource can appear in multiple iterations. In some embodiments, only resources with vulnerabilities are chosen at each iteration so that, as a result, only attack chains that start at resources with vulnerabilities where a malicious attacker could begin an attack are identified.

The current operations described in reference to FIG. 4 are described for iterations starting at an earliest attack stage and tracking attack chains forward through the attack stage framework. The operations at each block can be modified for starting at a latest attack stage and tracking attack chains backwards through the attack stage framework, for instance, by switching operations for outgoing edges to incoming edges and vice versa, by switching "previous attack stage" with "later attack stage" and vice versa, etc. For multiple resources having a same attack stage, ties can be broken arbitrarily (e.g., using a random number generator) or can be according to other factors such as importance metrics associated with misconfigurations at each resource. In some embodiments, the attack chain analyzer can only iterate through connected resources in the graph structure (e.g., resources with at least one outgoing or incoming edge) to reduce computational cost and alert fatigue in attack chain detection. Example operations at each iteration occur at blocks 407, 409, 411, 413, 415, 417, 419, and 421.

At block 407, the attack chain analyzer determines whether the current resource has an incoming edge from a resource at a previous attack stage. Note that if the current resource has an incoming edge from a resource at a previous attack stage, then the current resource has been visited and added to a resource group previously during DFS occurring at subsequent blocks 409, 411, 413, 415, 417, 419, and 421 therefore these blocks are skipped. If the attack chain analyzer determines that the current resource has an incoming edge from a resource, flow skips to block 423. Otherwise, flow proceeds to block 409.

At block 409, the attack chain analyzer initializes a resource group in the list of resource groups corresponding to the current resource. The attack chain analyzer can, to exemplify, initialize a bit string of resource bits having a 1 bit at the placement for the attack stage of the current resources and zeroes elsewhere, and having a first bit substring of the resource group bits comprising an identifier for the current resource.

At block 411, the attack chain analyzer initializes an adjacency stack and pushes the current resource to the adjacency stack. The adjacency stack will be used to perform recursive DFS of the graph structure starting at the current resource based on the order of remaining resources in the queue as described in the operations at blocks 413, 415, 419 and 421.

At block 413, the attack chain analyzer determines whether there is an additional resource in the adjacency stack. If there is an additional resource in the adjacency stack, flow proceeds to block 415. If the adjacency stack is empty, flow skips to block 423.

At block 415, the attack chain analyzer pops the additional resource from the adjacency stack and appends the additional resource to the current resource group. For the above example of bit strings, the append operation comprises adding an identifier of the additional resource as a substring to the resource group bits with placement in the bit string based on the current number of resources in the resource group (as indicated by the number of ones in the attack stage bits) and adding a 1 to the attack stage bits at a placement corresponding to the attack stage of the additional resource.

At block 417, the attack chain analyzer determines whether there is an adjacent resource to the additional resource with a later attack stage. Adjacent resources comprise resources in the graph structure having a directed edge from the additional resource to the adjacent resource. Adjacent resources and corresponding attack stages to the additional resource can be indicated in the graph structure for the misconfigured resources. If there is an adjacent resource with a later attack stage, flow proceeds to block 419. Otherwise, flow proceeds to block 421.

At block 419, the attack chain analyzer pushes a list of adjacent resources to the additional resource with later attack stages ordered by attack stage to the adjacency stack. The graph structure for the misconfigured resource can have adjacent resources presorted by attack stage (for instance, as ordered when adding outgoing edges at the additional resource to the graph structure). Because each misconfigured resource can have multiple attack stages, resources can be pushed to the adjacency stack multiple times during the DFS. Flow returns to block 413.

At block 421, the attack chain analyzer stores the current resource group and removes the appended additional resource from the current resource group. The attack chain analyzer stores the current resource group in the list of resource groups because later resources (in particular, the additional resource) are removed during subsequent DFS recursions which removes corresponding identifiers and attack stages appended to the current resource group. The attack chain analyzer can remove the appended additional resource from the current resource group by setting the bit corresponding to the attack stage for the additional resource in the attack stage bits to zero and setting the bit substring corresponding to the identifier of the additional resource (for instance, as indicated by the number of resources prior to the additional resource in the current resource group) to zero. Flow returns to block 413.

At block 423, the attack chain analyzer determines whether there is an additional misconfigured resource. If there is an additional misconfigured resource, flow returns to block 405. Otherwise, the flow proceeds to block 425.

At block 425, attack chain analyzer persists attack chains indicated in the list of resource groups. For example, the attach chain analyzer generates a value or data structure(s) that identifies each attack chain. The attack chain analyzer scans each resource group to determine identifiers of resources in the corresponding attack chain and their attack chains, for instance, as indicated by the sequence of 1 bits in the attack chain bits. The attack chain analyzer can additionally query/retrieve metadata associated with each resource in each attack chain (as indicated by the identifiers) and metadata associated with corresponding vulnerabilities for resources and policy misconfigurations for pairs of resources. The attack chains and any of the collected metadata can be displayed to a GUI and/or otherwise indicated for remediation.

FIG. 5 is a flowchart of example operations for generating a graph structure for misconfigured cloud resources. At block 501, an attack chain analyzer identifies pairs of resources indicated in resource pair exposure characteristics and resources indicated in resource vulnerabilities. In some embodiments, policy misconfigurations in the resource pair exposure characteristics will have logical syntax for resources that are able to access/have security exposure to a given resource (e.g., "*" syntax in a policy field). In these embodiments, the attack chain analyzer will parse the logical syntax and apply the logical rule to the set of analyzed resources to extract resource identifiers for all resources (e.g., multiple pairs of identified resources) satisfying the logical syntax. Additionally, in some embodiments where resource vulnerabilities have associated severities, the attack chain analyzer can refrain from identifying resources with vulnerabilities having severity below a threshold severity (e.g., benign vulnerabilities).

At block 505, the attack chain analyzer initializes nodes in a graph structure associated with each identified resource and corresponding metadata/attack chain stage. The attack chain analyzer can construct the graph structure such that nodes can be queried for resource metadata such as identifiers, vulnerabilities, policy misconfigurations with other resources, attack stages, etc. Each attack stage stored at a node for a resource corresponds to a stage of a malicious attack going towards the resource due to the corresponding policy misconfiguration or a stage of a vulnerability for that resource. Note that the attack stages for policy misconfigurations are associated with directed edges whereas attack stages for vulnerabilities are associated with the resources themselves. Resources can have multiple attack stages associated with multiple vulnerabilities and/or policy misconfigurations. The attack stage(s) for vulnerabilities can be stored as an ordered list in association with the resources.

At block 507, the attack chain analyzer adds edges in the graph structure corresponding to identified pairs of resources. Each edge in the graph structure has a direction according to a corresponding policy misconfiguration for the identified pair of resources. The edge originates at the node where a malicious attack starts according to the attack framework and points towards the node where the malicious attack continues at the corresponding attack stage. The attack chain analyzer adds adjacency lists to each node that store the adjacent nodes (via outgoing directed edges) and attack stages of the corresponding edges/policy misconfigurations. The attack chain analyzer can order these adjacency lists by attack stage. In some embodiments, the graph structure can have multiple connected components (i.e., separate graphs) corresponding to sub-graph structures, for instance representing distinct sub-entities (sub-departments, teams, etc.) of an entity having mutually exclusive security exposure. The attack chain analyzer can prune certain nodes from the graph structure such as isolated nodes (i.e., that form their own connected component) for the purposes of attack chain analysis.

Variations

While described for attack stages in a framework for attack chain analysis of malware, the present disclosure can be applied to any framework involving sequential stages of misconfigurations of resources including cloud resources and resources in other computing environments. Moreover, DFS is used for identifying attack chains as an example algorithm and any suitable algorithm for identifying chains with a sequential stage-based framework can be used (e.g., breadth-first search). Iterative and/or recursive DFS can be implemented and any data structure tracking attack chains including but not limited to the bitmasks disclosed herein can be used to speed up computational speed of attack chain identification.

The operations for DFS depicted in FIG. 4 are for an attack stage framework wherein attack chains have resources with distinct attack stages. In other embodiments, attack chains can comprise resources with same attack stages occurring consecutively. In these embodiments, the attack chain analyzer can maintain a data structure of visited resources with corresponding attack stages that adds resource/attack stage pairs for each visited resource at each recursive step. The attack chain analyzer can determine whether adjacent resources with a same attack stage are indicated in the data structure at each recursive step and can omit previously visited resource/attack stage pairs from the list of adjacent resources that is pushed to the adjacency stack. The type of data structure used and method for avoiding infinite cycles can depend on the graph search algorithm used to generate attack chains.

DFS, BFS, or other algorithms for identifying attack chains by the attack chain analyzer as disclosed herein can be optimized using various techniques. For instance, DFS and/or BFS with bounded depth analysis can be implemented. The bounded depth determines a maximum depth to search when performing DFS and/or BFS. This maximum depth can be determined by analyzing previous malicious attacks for the number of resources that the attackers traversed, then generating statistics for the number of resources corresponding to each attack. For instance, the maximum depth can be determined as a number of standard deviations (e.g., 2) above the mean number of resources. The maximum depth can additionally be tuned according to operational considerations such as the number of vertices and edges in the graph structure of resources, available computing resources, etc.

Another optimization technique is to implement DFS and/or BFS with bounded width. The attack chain analyzer can, when adding resources to an adjacency list of a current resource during DFS/BFS, select the top-N adjacent resources according to heuristics for ranking resources. For instance, resources can be ranked according to relative importance to corresponding organization(s), severity of corresponding misconfigurations and vulnerabilities, etc.

This importance can be determined when generating the graph structure and can be stored in association with the resources, and adjacent resources at each vertex can be sorted by relative importance (in addition to being sorted by attack stage) in the graph structure. N can be determined similarly to the maximum depth described above based on operational considerations for implementing DFS/BFS on the graph structure.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the collection and analysis of resource misconfiguration data at block 401 can occur in parallel and concurrently across cloud resources. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 6:
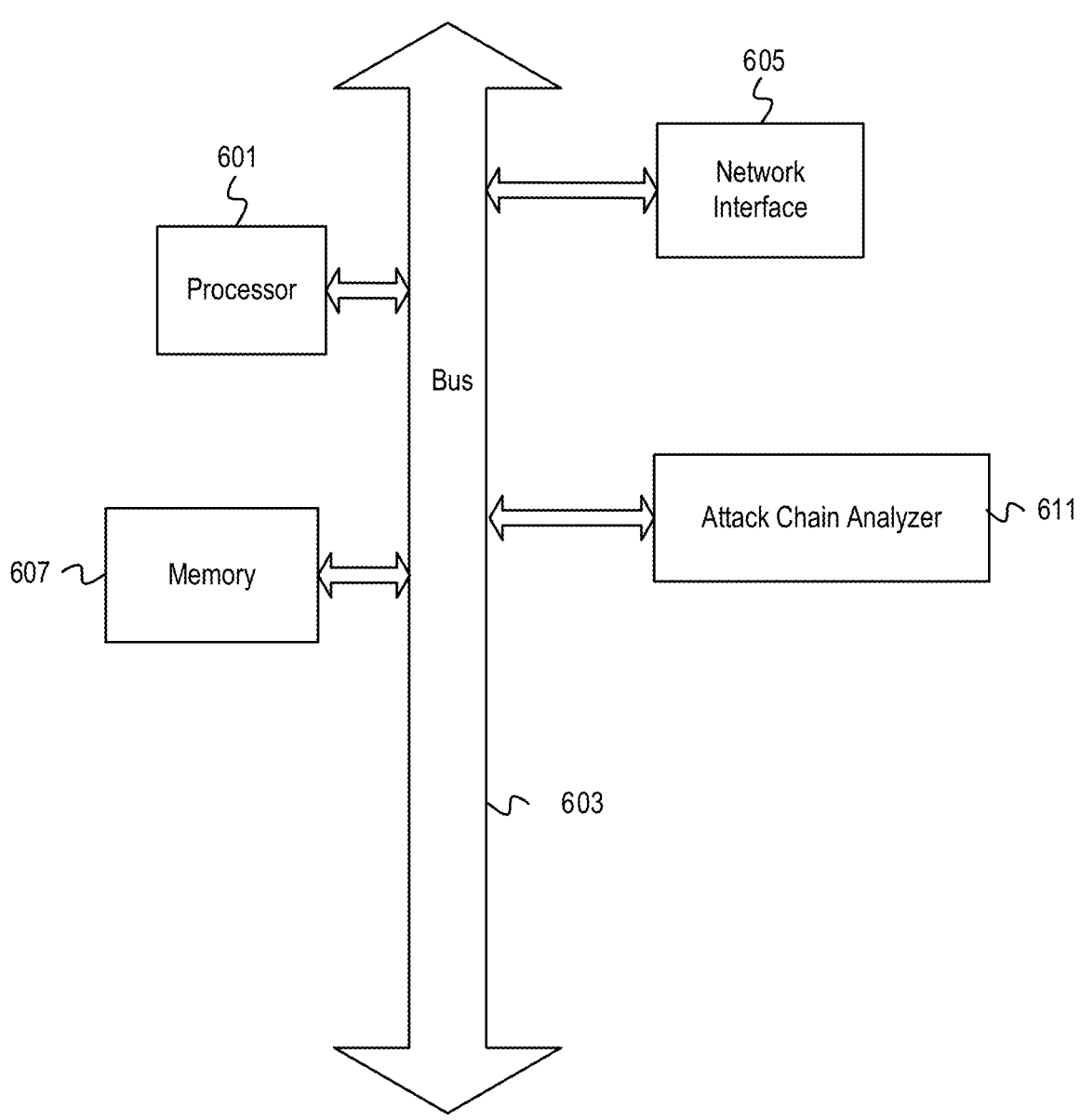
FIG. 6 depicts an example computer system with an attack chain analyzer.

FIG. 6 depicts an example computer system with an attack chain analyzer. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes an attack chain analyzer 611. The attack chain analyzer 611 can apply DFS to cloud resources starting at an initial resource and iterating through resources ordered according to a stage-based attack framework, wherein resource adjacency in the DFS is according to resource misconfigurations. The attack chain analyzer 611 can further generate diagnostic logs for attack chains identified in the DFS using cloud resource pair exposure characteristics and cloud resource vulnerabilities, as described variously above. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for identifying attack chains across cloud resources according to an attack stage framework and cloud resource misconfigurations as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:

detecting a plurality of misconfigurations for a subset of resources in a plurality of resources, wherein the plurality of misconfigurations comprises at least one of policy misconfigurations and vulnerabilities for the subset of resources;

generating a graph structure having vertices corresponding to the subset of resources and edges corresponding to pairs of resources in the subset of resources with pairwise exposure characteristics indicated in the plurality of misconfigurations;

identifying, from sequences of resources in the graph structure, a first sequence of resources arranged according to sequential stages in an attack stage framework, wherein each pair of consecutive resources in the first sequence of resources comprises a pair of resources that correspond to a sequential stage of the sequential stages in the attack stage framework; and based on identifying the first sequence of resources, remediating misconfigurations for one or more resources in the first sequence of resources.

2. The method of claim 1, wherein identifying the first sequence of resources from the subset of resources arranged according to sequential stages of corresponding resources in an attack stage framework comprises traversing the graph structure for the plurality of resources from a first vertex corresponding to a first initial resource in the first sequence of resources, wherein traversing the graph structure comprises traversing the graph structure along edges in the graph structure to adjacent vertices corresponding to resources having same or later stages in the attack stage framework.

3. The method of claim 2, wherein traversing the graph structure for the plurality of resources comprises depth-first searching the graph structure for the plurality of resources.

4. The method of claim 3, further comprising ordering adjacent vertices during the depth-first searching of the graph structure for the plurality of resources according to sequential stages in the attack stage framework for resources corresponding to the adjacent vertices.

5. The method of claim 1, further comprising identifying a second sequence of resources from the subset of resources.

6. The method of claim 5, wherein identifying the second sequence of resources comprises traversing the graph structure for the plurality of resources from a second vertex corresponding to a second initial resource in the second sequence of resources.

7. The method of claim 1, wherein remediating misconfigurations for one or more resources in the first sequence of resources comprises, determining that a severity metric for a vulnerable resource in the one or more resources is above a first threshold for remediation; and based on determining that the severity metric for the vulnerable resource in the one or more resources is above the first threshold, updating at least one of software and firmware at the vulnerable resource corresponding to a security vulnerability for the vulnerable resource.

8. The method of claim 1, wherein remediating misconfigurations for one or more resources in the first sequence of resources comprises, determining that a severity metric for pairwise exposure characteristics for a first pair of resources in the one or more resources is above a second threshold for remediation; and based on determining that the severity metric is above the second threshold for remediation, updating a policy for at least one resource in the first pair of resources.

9. The method of claim 1, wherein remediating misconfigurations for one or more resources in the first sequence of resources comprises, identifying a set of key resources from the first sequence of resources that expose remaining resources in the first sequence of resources to security vulnerabilities; and remediating misconfigurations for the set of key resources.

10. The method of claim 1, wherein the first sequence of resources comprises a potential attack chain for a malicious attack to the plurality of resources.

11. A non-transitory computer-readable medium having program code stored thereon, the program code comprising instructions to:

detect a first cloud resource of a plurality of cloud resources that has a misconfiguration, wherein cloud resources in the plurality of cloud resources are related according to a graph structure with vertices of the graph structure corresponding to cloud resources and edges of the graph structure corresponding to exposure characteristics for pairs of cloud resources in the plurality of cloud resources;

traverse the graph structure from a first vertex indicating the first cloud resource, wherein the instructions to traverse the graph structure comprise instructions to traverse the graph structure through vertices indicating cloud resources arranged according to sequential attack stages in an attack stage framework; and identify a potential attack chain of cloud resources in the plurality of cloud resources based, at least in part, on the traversal of the graph structure.

12. The computer-readable medium of claim 11, wherein the instructions to traverse the graph structure according to sequential stages in the attack framework indicated in vertices corresponding to resources in the plurality of cloud resources comprise instructions to depth-first search the graph structure with adjacent vertices in the graph structure ordered according to sequential stages in the attack framework indicated in the adjacent vertices.

13. The computer-readable medium of claim 11, wherein the program code further comprises instructions to, based on identifying the potential attack chain of cloud resources in the plurality of cloud resources, remediate one or more resources in the potential attack chain of cloud resources.

14. The computer-readable medium of claim 13, wherein the instructions to remediate one or more resources in the potential attack chain of cloud resources comprise instructions to at least one of, update policy misconfigurations of resources in the one or more resources; and update at least of one of software and firmware of resources in the one or more resources, wherein the at least one of software and firmware is exposed to one or more security vulnerabilities.

15. An apparatus comprising:

a processor; and a non-transitory computer-readable medium having instructions stored thereon that are executable by the processor to cause the apparatus to, generate one or more structures comprising a graph structure of a first plurality of cloud resources based on at least one of policy misconfigurations and resource vulnerabilities for resources of the first plurality of cloud resources;

identify one or more potential attack chains based on traversal of the one or more structures comprising the graph structure, wherein each potential attack chain in the one or more potential attack chains comprises an ordered sequence of cloud resources from the first plurality of cloud resources, wherein the instructions executable by the processor to cause the apparatus to identify the one or more potential attack chains based on traversal of the one or more structures comprising the graph structure comprise instructions executable by the processor to cause the apparatus to, for each structure in the one or more structures corresponding to an attack chain in the one or more potential attack chains, traverse the structure from a first vertex in the structure according to sequential stages in an attack stage framework for resources corresponding to additional vertices in the structure; and remediate at least a subset of the one or more potential attack chains based, at least in part, on the policy misconfigurations and resource vulnerabilities for resources in the first plurality of cloud resources.

16. The apparatus of claim 15, wherein the instructions executable by the processor to cause the apparatus to traverse the structure from the first vertex in the structure according to sequential stages in the attack stage framework for resources corresponding to vertices in the structure comprise instructions executable by the processor to cause the apparatus to depth-first search the structure from the first vertex according to sequential stages in the attack stage framework for resources corresponding to vertices in the structure.

17. The apparatus of claim 15, wherein the instructions to remediate at least the subset of the one or more potential attack chains comprise instructions executable by the processor to cause the apparatus to, identify the subset of the one or more potential attack chains for remediation based, at least in part, on severity metrics for policy misconfigurations and resource vulnerabilities of resources in the one or more potential attack chains; and remediate at least one of policy misconfigurations and resource vulnerabilities for resources in the identified subset of the one or more potential attack chains.

18. The apparatus of claim 15, wherein the instructions to remediate the at least the subset of the one or more potential attack chains comprise instructions executable by the processor to cause the apparatus to at least one of, update policy misconfigurations of resources in the first plurality of cloud resources; and update at least of one of software and firmware of resources in the first plurality of cloud resources, wherein the at least one of software and firmware is exposed to one or more resource vulnerabilities.

* * * * *